United States Patent [19]

D'Ambrogio et al.

[11] Patent Number: 5,375,124
[45] Date of Patent: Dec. 20, 1994

[54] METHOD AND APPARATUS FOR PROVIDING ISDN ACCESS

[75] Inventors: William J. D'Ambrogio, Oceanport, N.J.; Karen M. McCourt, Raleigh, N.C.; Wayne D. Phillips, Randolph, N.J.; Patricia D. Saleh, Holmdel, N.J.; Barry S. Seip, New Providence, N.J.

[73] Assignee: AT&T Corp., Murray Hill, N.J.

[21] Appl. No.: 839,452

[22] Filed: Feb. 20, 1992

[51] Int. Cl.$^5$ .............................................. H04J 3/12
[52] U.S. Cl. .................................. 370/110.1; 379/284
[58] Field of Search ...................... 370/110.1, 60, 94.1, 370/68.1, 42, 43, 54, 58.1; 379/202, 212, 221, 279, 284, 207, 230

[56] References Cited

U.S. PATENT DOCUMENTS

| | | | |
|---|---|---|---|
| 4,736,364 | 4/1988 | Basso et al. | 370/110.1 |
| 5,043,983 | 8/1991 | Dorst et al. | 370/110.1 |
| 5,050,005 | 9/1991 | Kagami | 370/110.1 |
| 5,051,992 | 9/1991 | Taniguchi et al. | 370/110.1 |
| 5,150,357 | 9/1992 | Hopner et al. | 370/110.1 |
| 5,193,110 | 3/1993 | Jones et al. | 370/110.1 |
| 5,212,691 | 5/1993 | Hokari | 379/221 |

OTHER PUBLICATIONS

Bell System Technical Journal, vol. 56, No. 7 Sep. 1977, pp. 1015–1320.
Bell System Technical Journal, vol. 57, No. 2, Feb. 1978, pp. 221–477.

Primary Examiner—Douglas W. Olms
Assistant Examiner—Shick Hom
Attorney, Agent, or Firm—Barry H. Freedman

[57] ABSTRACT

ISDN access to a telecommunications network is provided to customers at different locations by sharing a D-channel controllers (DCC's) positioned within the network in close proximity to the ISDN-capable toll switches serving those customers. The customers provide call set up parameters to a DCC via a user interface system (UIS) at the customers premises that communicates via a dial-up data connection with a respective user support system (USS) connected to the DCC. The DCC in turn formulates ISDN signaling messages that are sent to the switch via a PRI interface and set up an appropriate communications path through the network to a desired destination. Data originating in customer premises equipment is received in the switch via a T1 access line operating in the "non-facility associated signalling" mode. Alternatively, a central USS located in a control center within the telecommunications network, transmits, via dial-up data connections, signalling information to individual USS's supporting associated DCC's.

8 Claims, 5 Drawing Sheets

METHOD AND APPARATUS FOR PROVIDING ISDN ACCESS

FIELD OF THE INVENTION

This invention relates generally to Integrated Services Digital Network (ISDN) telecommunications systems, and, in particular, to method and apparatus for providing customers with the ability to generate signaling messages necessary to support ISDN communications without the need for a local D-channel controller (DCC).

BACKGROUND OF THE INVENTION

ACCUNET® switched 384 and 1536 digital data services available from AT&T, and other similar services available from other inter-exchange telecommunications carriers, are usage-sensitive dial-up digital data services capable of transporting 384 Kbps and 1.536 Mbps rate data between customer presses locations. These offerings are well suited for such dial-up, i.e., on-demand, high speed data transmission applications, as bulk data transfer, computer graphics, enhanced teleconferencing, video communications, computer aided design, image transfer and retrieval, and so on.

Currently, customers obtain access/egress to the above-described transport services by, for example, using private lines between the customer presses and the inter-exchange carrier location. In a common arrangement, access is provided via the ACCUNET® T1.5 service (also known as T1 service), which includes 1.544 Mbps digital private lines that are available from AT&T, and that use Primary Rate Interface (PRI) signaling. These private lines connect a toll switch (for example, a 4ESS™ switch that supports Integrated Services Digital Network (ISDN) interface standards, with Customer Premises Equipment (CPE) that also supports the ISDN protocol.

While the foregoing arrangement is satisfactory for some customers, it has some drawbacks, notably cost. In particular, in order to advise the ISDN switch of information needed for routing, it is necessary for the customer to have interface equipment, generally known as a D-channel controller (DCC), to generate ISDN signaling messages based upon customer defined call set-up parameters. However, many customers cannot presently afford to obtain the advantages associated with ISDN service, since the cost of a D-channel controller and a D-channel is prohibitively high.

In addition, the present arrangement is inefficient, because, in order to obtain ISDN 1.536 Mbps functionality, a minimum of two 1.544 Mbps T1 transmission lines are presently required. More specifically, a T1 line has, in reality, somewhat less than 1.544 Mbps transmission capability, because of signaling overhead. Even if the full 1.544 Mbps capacity were available, it would not be enough: the ISDN format requires a 1.536 Mbps transmission channel, plus a 64 Kbps signaling channel, adding up to more than the T1 capability. If two T1 lines are used for only one ISDN link, the excess capacity (approximately 1.480 Mbps) is essentially wasted.

SUMMARY OF THE INVENTION

In accordance with one embodiment of the present invention, D-channel controllers are located within the telecommunications network, preferably in close proximity to each ISDN-capable toll switch. Each DCC, and the D channel between the DCC and its associated switch, is shared among customers at different locations. The DCC is accessed by such customers via a dial-up data connection, illustratively established between a user interface system (UIS) at the customer premises and a user support system (USS) connected to the DCC. When the DCC receives call set up parameters from a customer, it generates ISDN signaling messages that are transmitted to the associated toll switch via a PRI interface on the shared D-channel, thereby establishing a communications path from customer's equipment through an ordinary T1 line operating in the non-facility associated signaling (NFAS) mode to the switch, and thence to a desired destination.

Since each D-channel controller and its D channel are used in common by multiple customers served by a given toll switch, and each DCC is capable of controlling as many as 20 NFAS T1 links, large economies are effected. In this way, customers can obtain a single T1 link for the purpose of access, and use available switched digital services in order to easily obtain "on-demand" switched telecommunications transmission capability.

In another embodiment of the present invention, a central USS is located in a control center within the telecommunications network, and communicates with each individual USS Supporting an associated DCC via dial up data connections. The central USS is accessed by customers in diverse locations via dial-up data connections, formulates signaling messages based upon set-up parameters received from customer's UIS, and passes these messages to the appropriate DCC, illustratively using another USS connected to the DCC. The DCC then formulates ISDN signaling messages for transmission to the associated switch.

DETAILED DESCRIPTION

Figure 1:
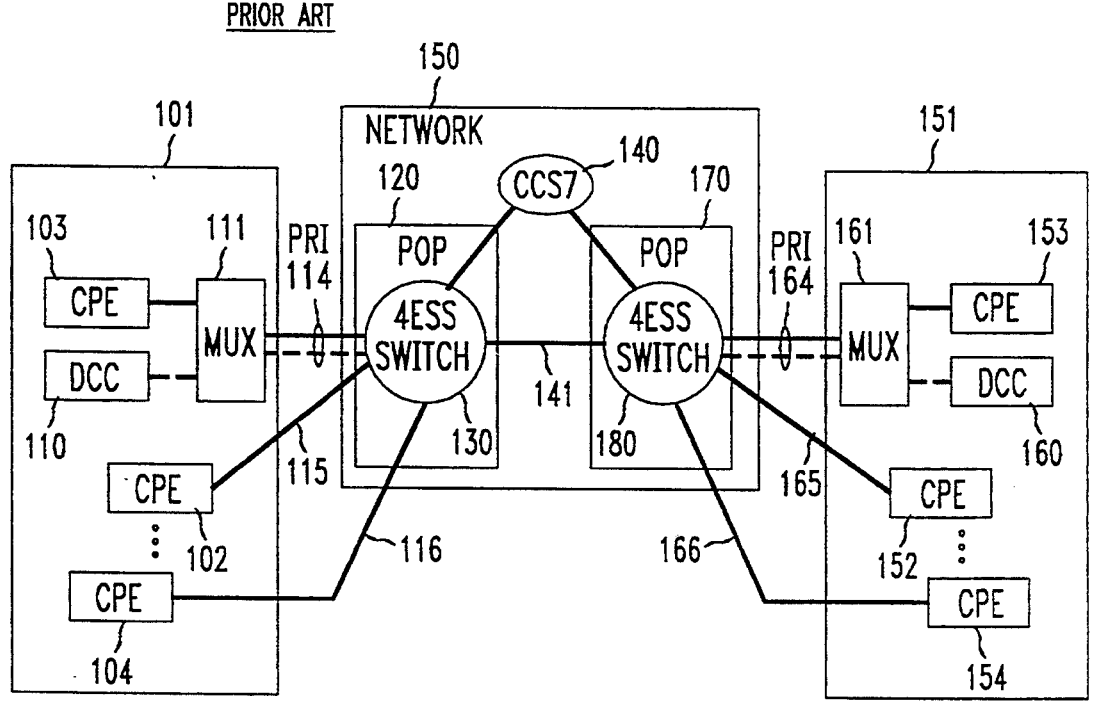
FIG. 1 is a block diagram of a prior art telecommunications arrangement wherein signaling messages for digital traffic carded in one or more communication channels connecting customer premises equipment to an ISDN capable switch are routed from a D-channel controller located at a customer location to the switch via a PRI link.

Referring first to FIG. 1, there is shown a block diagram of a prior at telecommunications arrangement wherein a telecommunications customer having customer premises equipment (CPE) 102-104 at customer premises 101 can communicate to distant locations, such as second customer premises 151, via a switched digital communications network 150 using the ISDN protocol. While in FIG. 1, network 150 is shown as including two ISDN capable switches 130 and 180 (which may be implemented as 4ESS electronic switches available from AT&T) located within respective Points of Presence (POPs) 120 and 170, interconnected by a link 141, in actuality, network 150 may include additional switches. A description of the 4ESS switch is contained in Bell System Technical Journal (BSTJ) Vol. 56, No. 7, pp 1015-1320, September 1977.

Switches in network 150, including switches 130 and 180, are each connected to signal transfer points in a Common Channel Signaling (CCS7) network 140, which is a digital packet network arranged to carry CCS7 signaling messages between switches. The CCS network is explained in BSTJ Vol. 57, No. 2, February 1978.

CCS7 signaling messages are originated in switches 130 and 180, based upon ISDN signaling messages in PRI format received in each switch via an input on the D-channel (shown as a dashed line) portion of access line 114. The contents of ISDN messages, in turn, are based upon call set-up parameters (i.e., information derived from the calling and called parties as well as information about desired bandwidth, etc.) The CCS7 messages instruct switches 130 and 180 in network 150 to set up paths, such as link 141, so that communications originating in one customer premises location can be extended to the desired endpoint or destination.

Using network 150, a telecommunications customer can today obtain dial-up digital data service at 384 Kbps and at 1.536 Mbps rates, depending upon the type of information generated in CPE 102-104 and the price that the customer is willing to pay for the communications service. For many "communications intensive" applications such as computer communications and video processing, some CPE such as CPE 102 and 104 may require the higher 1.536 Mbps rate, while other CPE such as CPE 103 may use a lower rate (384 Kbps) channel. In the case of the former, at least two T1 digital access lines 114 and 115 are typically required between customer premises 101 and the switch 130 in the nearest Point of Presence (POP) 120 within network 150 that serves those premises. In the example of FIG. 1, three access lines 114-116 are shown. At least two T1 lines are required because of capacity limitations, and the fact that a 64 Kbps D-channel is required on at least one of the access lines, in order to transport ISDN signaling messages formatted in accordance with the PRI protocol. When the capacity for D-channel signaling is allocated in, for example, access line 114 (dashed line) the remaining capacity on line 114 is only 1.472 Mbps (8 Kbps is required for framing purposes), which is insufficient for the 1.536 Mbps rate required by CPE 102. Thus, CPE 102 must be linked to switch 130 via a separate T1 access line 115, using what is commonly known as Non-Facility Associated Signaling (NFAS). CPE 104, also assumed to require 1.536 Mbps service, is linked to switch 130 via yet another T1 access line 116. Note that lines 115 and 116 need not include a D-channel for signaling; these lines support 24 channels, each of 64 Kbps capacity, using what is commonly known as the D4 framing format. Alternatively, the extended super frame (ESF) format, which is preferred in the ISDN environment, can be used.

The NFAS concept will be understood by noting the presence in customer premises 101 of D-channel controller (DCC) 110, which is connected to access line 114 via a multiplexer 111. DCC 110, which may be a PRImate system available from ISDN Technologies, Inc., or any similar product, prepares and encodes ISDN signaling messages in the 64 Kbps D-channel, and transmits these messages, formatted in accordance with the PRI protocol, to switch 130. At the switch, the ISDN signaling messages are received and translated to CCS7 messages which are in turn transmitted to appropriate locations in network 150 via signaling network 140. The "primary" function of the ISDN signaling messages generated in DCC 110 is to communicate with switch 130 in order to set up appropriate routing from that switch through network 150 for traffic such as 384 Kbps data originating in CPE 103 that is applied to switch 130 via the 23 B channels remaining on the same access line 114 that contains the ISDN signaling messages themselves. However, DCC 110 can also provide switch 130 with ISDN signaling messages for traffic from "other facilities", for example, 1.536 Mbps traffic that is applied to switch 130 from CPE 102 and 104 via access lines 115 and 116 that do not have their own D-channel. This capability—signaling on one access line with respect to traffic on a different access line—is called non-facility associated signaling. Indeed, most D-channel controllers currently include sophisticated and relatively expensive circuitry arranged to generate ISDN signaling messages that can be used to route traffic originating from CPE connected to switch 130 via up to as many as 20 additional T1 access lines. Without the present invention, these access lines had to serve a single customer location, i.e., customer premises 101.

If the arrangement in customer premises 151 is similar to the arrangement in customer premises 101 (i.e., DCC 160 provides ISDN signaling in PRI format for CPE 153 via the D-channel in access line 164 and NFAS ISDN signaling for CPE 152 and 154 via access lines 165 and 166), CPE 102 (or 104) can communicate with CPE 152 (or 154) over a two-way, switched digital 1.536 Mbps channel through network 150, using NFAS signaling capabilities of both DCC 110 and DCC 160. In addition, CPE 103 (and other CPE requiting bandwidth available in access line 114) can communicate with CPE 153 over a two-way, switched digital 384 Kbps channel through network 150, using DCCs 110 and 160 in their primary mode.

With the arrangement of FIG. 1, there is often excess, and therefore "wasted" capacity in the access lines connecting the customer premises to the network. Also, the need for a separate D-channel and D-channel controller in each customer premises can be prohibitively expensive for many customers.

Figure 2:
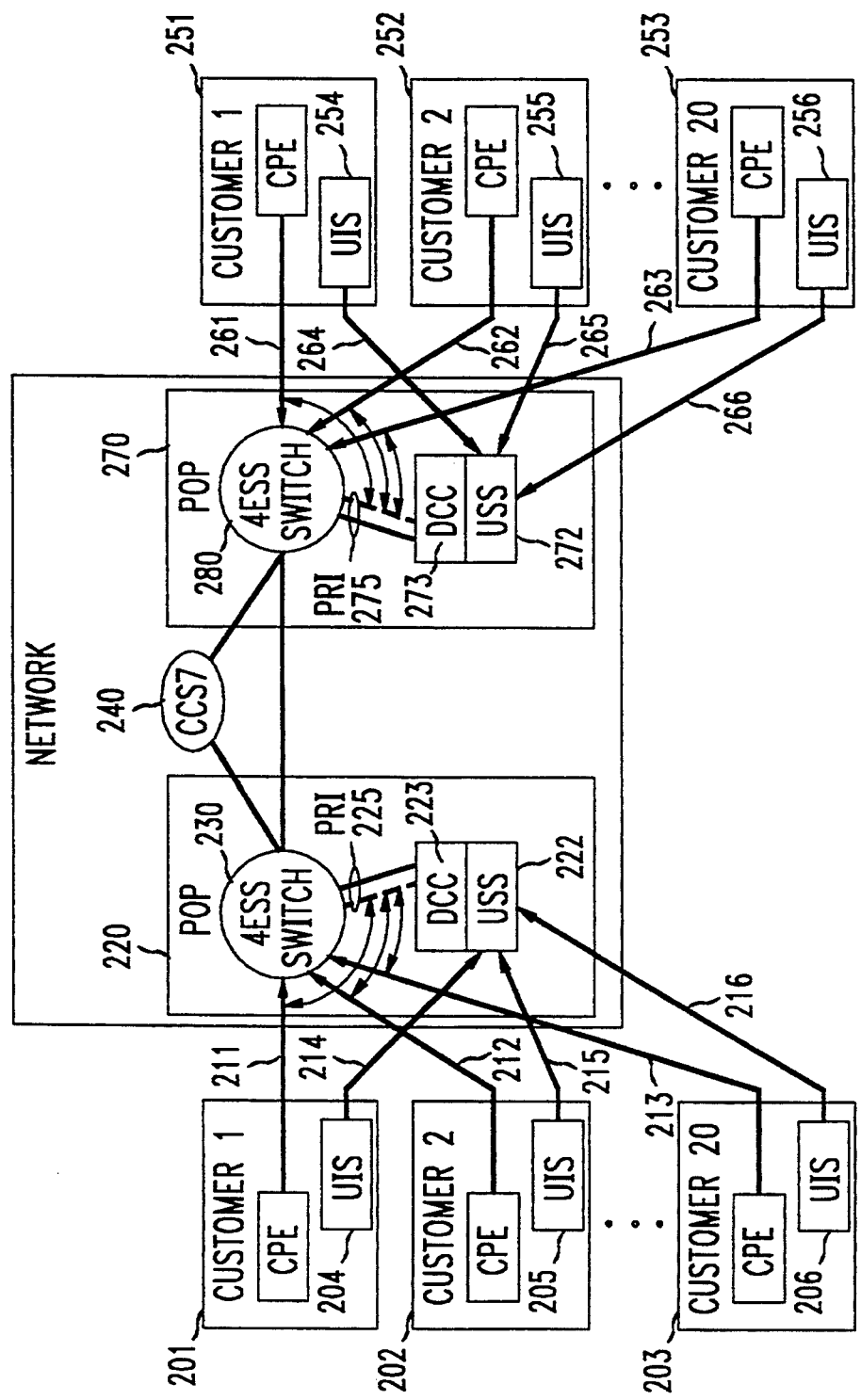
FIG. 2 is a block diagram of one embodiment of our invention, in which a D-channel controller and a user support system (USS) are located in proximity to each toll switch in a communication network and used in common by multiple customers served by each switch to set up switched digital communications channels over individual transmission facilities connecting each customer to the associated switch.

In FIG. 2, an arrangement in accordance with one embodiment of the present invention is illustrated in which a single D-channel controller and a single D channel, is shared among many customers served by the same toll switch and provides ISDN signaling messages for the communications channels (typically 24 B channels) that exist in the several access lines (which can originate in different locations) connecting each of those customers to the switch. As illustrated therein, a first D-channel controller 223 is located within POP 220 in proximity to a first ISDN capable switch 230, and a second D-channel controller 273 is located within POP 270 in proximity to a second ISDN capable switch 280. Other DCC's would be associated with other switches in the network. DCCs 223 and 273 are connected to and receive inputs from respective user support systems (USS's) 222 and 272, and provide ISDN signaling messages in PRI format to respective switches 230 and 280 via the D-channel (dashed line) on T1 access lines 225 and 275. Other POPs within network 250, not shown, may be similarly configured.

In this arrangement, CPE in each customer premises is linked to the particular ISDN capable switch serving that customer in a nearby POP, by a single T1 access line that does not include a D-channel. A user interface system (UIS) in each customer premises is also linked to the DCC in the POP by an ordinary data (telephone) line. Thus, CPE in customer premises 201–203 are linked to switch 230 in POP 220 by access lines 211–213, respectively, and CPE in customer premises 251–253 are linked to switch 280 in POP 270 by access lines 261–263, respectively. All of these access lines are typically T1 lines using D4 or ESF framing. Call set-up parameters needed to generate D-channel signaling messages for communications originating at customer premises 201–203 are transmitted to USS 222 in POP 220 from a particular UIS 204–206. The connection between UIS 204–206 and USS 222 may be ordinary voice grade telephone lines 214–216, respectively.

Call set-up parameters originated in each customer premises 201–203, are received in USS 222 from the respective UIS 204–206, converted to ISDN signaling messages in PRI format in DCC 223 and applied to switch 230 via the D-channel portion of access line 225. Thus, a single D channel is shared by many customers. In switch 230, the received ISDN signaling messages are converted to CCS7 messages and applied to signaling network 240. This establishes the appropriate communication paths between the various switches in network 250, such that digital information originated in customer premises 201–203 is routed (1) from customer equipment to the ISDN switch over an ordinary T1 line operating in the NFAS mode, and (2) from the switch via the telecommunications network to appropriate destinations, such as customer premises 251–253.

Note that in FIG. 2, customer premises 251–253 are likewise equipped with UIS 254–256, each of which communicate with USS 272 via telephone lines 264–266, thereby controlling the routing of digital signals applied to switch 280 via T1 links 261–263, respectively.

By virtue of the advantageous arrangement of FIG. 2 wherein DCC 223 and the D channel in access line 225 is shared by customers at multiple locations including customer premises 201–203, each individual customer can obtain the benefits of ISDN communications without bearing the expense of an individual D-channel or D-channel controller. In addition, each customer has an efficient access arrangement with respect to the network: a single T1 facility to carry 1.536 Mbps traffic, and an ordinary telephone line for UIS-to-USS signaling.

Figure 3:
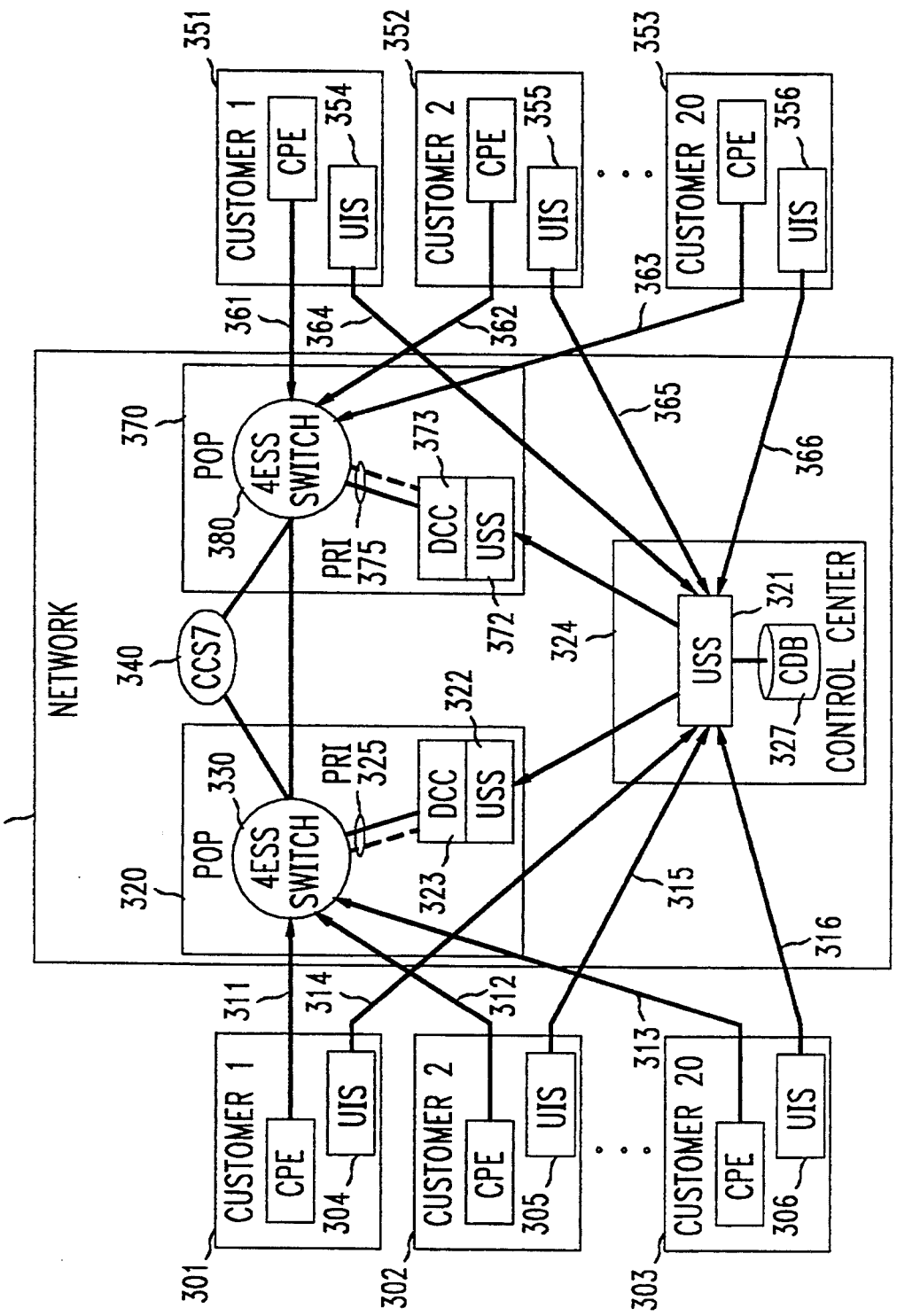
FIG. 3 is a block diagram of a second embodiment of our invention, in which a central USS is located in a control center within the telecommunications network, and communicates with the USS/DCC combination located in proximity to each toll switch in the network.

Referring now to FIG. 3, another embodiment of the present invention is illustrated in which a central user support system 321 is located in a control center 324 within telecommunications network 350. In this arrangement, as in FIG. 2, CPE in customer premises 301–303 is connected to the toll switch 330 serving that customer via respective T1 access lines 311–313. These access lines do not have D-channels. UIS 304–306 in each customer premises 301–303 communicates call setup parameters to central USS 321 typically via ordinary telephone lines 314–316. Call set-up parameters received from each UIS are processed in central USS 321 in a similar manner as in the arrangement of FIG. 2, and passed to the individual USS (e.g., USS 322) supporting an associated DCC (e.g., DCC 323) located in close proximity to the switch serving the customer. The USS/DCC combination prepares appropriate ISDN signaling messages in PRI format in the same manner as described in connection with FIG. 2, and applies the messages to switch 330 via the D-channel on access line 325.

In the arrangement of FIG. 3, central USS 321 in control center 324 also supports communications originated in customer premises (such as customer premises 351–353) connected to and served by other switches (such as switch 380) in other POPs (such as POP 370). Thus, a single central user support system can support the entire network 350. However, for reliability or other purposes, it may sometimes be prudent to include several central USS's and/or several control centers within network 350. In any event, because of the shared use of central USS 321 by customers served by several toll switches, it is desirable to utilize a customer data base (CDB) 327 in control center 324 to, for example, store information relating to the data rate associated with the called party number and the originating customer interface (T1.5), interpret call set-up parameters received from various customer premises, and convert the information to appropriate format before being applied to USS 322 and DCC 323 (or to other USS's and associated D-channel controllers such as USS/DCC 372/373).

Figure 4:
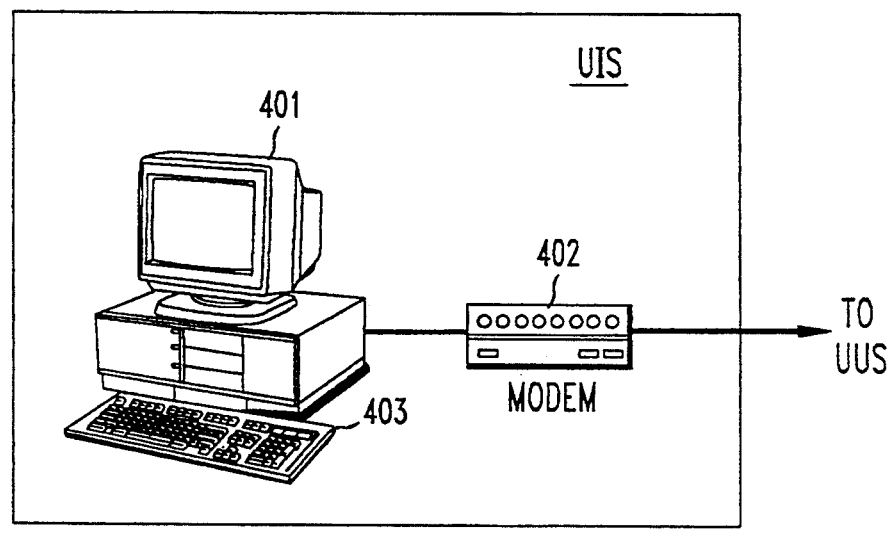
FIG. 4 is a block diagram illustrating a typical arrangement for a user interface system such as UIS 204–206 and 254–256 of FIG. 2.

FIG. 4 is a block diagram illustrating a typical arrangement for a user interface system such as UIS 204–206 and 254–256 of FIG. 2. Each UIS, located at a customer premises, may be a personal computer 401, a "dumb" (ASCII/synchronous) terminal, or any other processor that requires only simple resident applications software in order to receive, format and prepare to send to the USS, manually entered (e.g., via keyboard 403) parameters, specifically call setup and tear down information. Alternatively, UIS functionality may be incorporated in the customer's application equipment, and programmed to automatically set up and tear down calls. A modem 402 providing a voice-band/data interface may be used to connect PC 401 in the UIS to the USS, so that call setup and tear down information generated in PC 401 in digital form can be communicated to the USS over voice grade lines.

Figure 5:
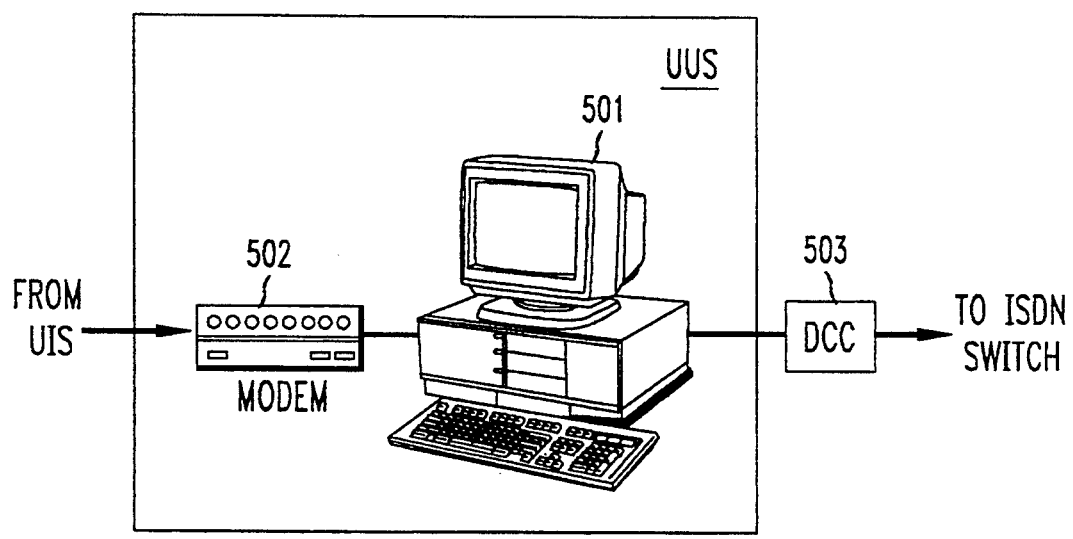
FIG. 5 is a block diagram illustrating a typical arrangement for a user support system such as USS 222 and 272 of FIG. 2 or USS 322 of FIG. 3.

FIG. 5 is a block diagram illustrating a typical arrangement for a user support system such as USS 222 or 272 of FIG. 2, USS 322 or 372, or central USS 321 of FIG. 3. The USS, if based in a POP, may be an integral part of the D-Channel Controller (DCC) or separate hardware. The USS contains processor hardware such as personal computer 501, and applications software required to support the interface between the UIS and the associated DCC such as DCC 503. A modem 502 forms the actual hardware interface between the USS of FIG. 5 and the remote UIS. Alternatively, software running on PC 501 can provide modem-like interfaces to multiple UIS's by, for example, processing inputs/outputs at multiple ports under common software control. Each modem, such as modem 502, automatically answers calls from a UIS, and prompts the customer (using user friendly queries and responses) for call setup and tear down information, e.g., called party number, data rate, and length of call, etc. By storing appropriate data in PC 501, each USS can support customized calling capabilities for each customer, such as abbreviated "dialing". Other features that may be provided are calling party number delivery, and call progress information during call setup and tear down. Information provided by the USS to the DCC is used to prepare ISDN PRI Q.931 protocol messages, which are sent to the ISDN switch for call setup and tear down. As stated previously, the DCC typically uses the ISDN PRI Non-Facility Associated Signaling (NFAS) capability to set up calls over the customer T1 access lines.

Because each USS may be used in common by multiple customers, certain security functions may be included, such as prompting the UIS for a customer login used to identify each customer, and for a password to prevent unauthorized users from accessing the USS. The supplied password may be checked in an internal database associated with PC 501. In addition, USS software is preferably partitioned to prevent one customer from interfering with another customer's call(s) in progress, which could otherwise result in accidental setup and tear down. Partitions between customers can also be based on the customer's login and/or password so that a separate customer profile can be provided for each customer. The profile includes permissions and capabilities supported at the customer's location.

If desired, the USS can also be remotely accessed by a "super user" for administration purposes, e.g., for adding new customers. The USS may support "super user" access via a modem interface, or an ISDN temporary signaling connection.

Figure 6:
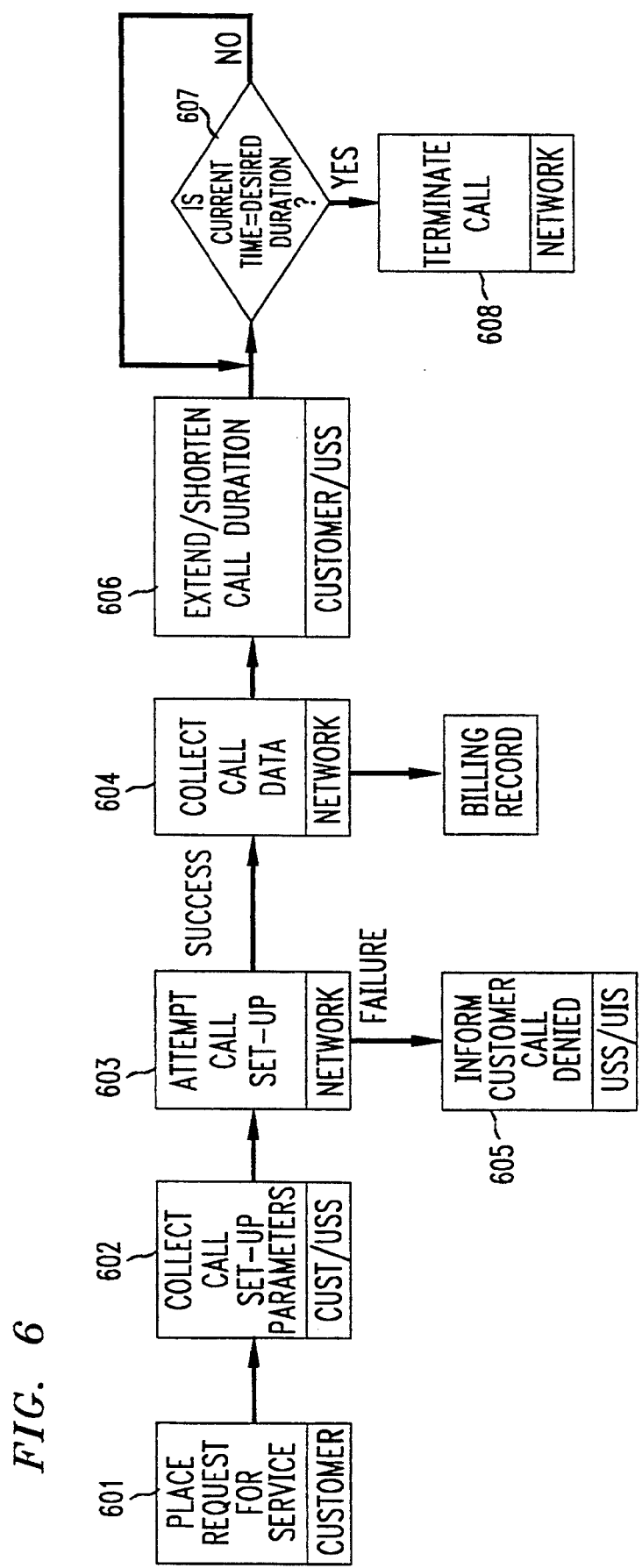
FIG. 6 is a flow diagram illustrating a functional view of the process performed in the system of FIG. 3.

A functional view of the process performed using the arrangement of FIG. 3 of the present invention is illustrated in FIG. 6. First, in step 601, a customer places a request for service by, for example, dialing into USS 321 using a predetermined 800 number. A suitable dialing interface is provided on personal computer 401 within the UIS of FIG. 4; alternatively, a dialing pad on a touch tone telephone may be used. In step 602, service parameters are developed in USS 321. This is done through a dialogue between the USS and the customer, which requests necessary call set up information, including scheduled time for a connection (if not immediate), location(s) to be connected, bandwidth desired, billing options, reach number in case of set up difficulties, and, advantageously, duration (or ending time) of the desired connection. Customer identity validation and verification of resource availability may also be performed. The user interface personal computer 401, provided by application software stored in memory, preferably presents the customer with a visual display of choices, taking into consideration available customer facilities. Alternatively, an audio interface would include a list of choices presented by a voice response unit such as an AT&T Conversant system.

In step 603, signaling network 340 within communications network 350 receives call set up information provided by the customer, which has been appropriately formatted by DCC 323 and applied to switch 330 via access line 325. An attempt is now made to actually set up the desired call. If successful, the process proceeds to step 604, otherwise the customer is informed of the problem or denial in step 605. The latter step could include presentation, at personal computer 401, of an indication of the reasons for the denial, such as display of a message indicating that the destination location is busy, insufficient capacity is available, terminating equipment is in a trouble condition, etc. In step 604, service data is collected in network 350, so that, for example, appropriate billing records can be formulated.

In step 606, DCC 323 monitors inputs from the customer to determine if the customer desires to change the previously specified termination time. In this manner, the customer is given the ability to terminate the connection earlier than scheduled or extend it beyond the time originally requested. If the customer has signaled the DCC with information indicative of such desire, the new information is stored in this step. Thereafter, in step 607, DCC 323 monitors the stored termination information to determine if termination should occur, i.e., if the stored call termination time equals or exceeds the current time. If the termination time has not been reached, the connection continues; otherwise, termination occurs in step 608.

Various modifications and adaptations may be made to the present invention by those skilled in the art. For this reason, it is intended that the invention be limited only by the appended claims. For example, other signaling arrangements can be implemented between the customers and the shared DCC located in the network, and the ISDN switch served by the DCC can be an intralata (local) ISDN switch or a PBX switch using the ISDN protocol, as well as a toll switch.

We claim:

1. A system for providing signaling messages to ISDN capable switches in a telecommunications network, said signaling messages containing information for routing ISDN calls connected to said switches from a plurality of customers served by said switches to desired destinations, said system comprising a D-channel controller within said network;

means for providing signaling messages derived from call set-up parameters generated by said customers to said D-channel controller, and means in said D-channel controller for formulating and sending to said switches ISDN signaling messages needed to set up appropriate paths through said network to route said ISDN calls to said desired destinations, wherein said providing means includes a processor for formatting said call set-up parameters and a modem for transmitting said parameters to said D-channel controller over a voice grade telephone line, and wherein said providing means further includes a processor for prompting said customers to enter individual elements of said call set-up parameters.

2. A system for providing access to ISDN capable switches in a telecommunications network, each of said switches serving a plurality of customers, said system comprising a plurality of D-channel controllers within the network, each D-channel controller associated with a respective one of said switches;

a respective user support system connected to each of said D-channel controllers, a user interface system at the premises of customers served by each of said switches, means for providing call set-up parameters generated in said customers premises from said user interface system to the one of said user support systems associated with the switch serving said customer, via a dial-up data connection, means for communication a signaling message derived from said call set-up parameters from said one user support system to its respective D-channel controller, means in said respective D-channel controller for formulating ISDN signaling messages and transmitting said messages to said switch serving said customer via a PRI interface, and means in said switch serving said customer for generating a signaling message needed to set up a communications path from the customer's premises through the network to a desired destination.

3. The invention defined in claim 2 further including means for providing data originating in equipment at the customer's premises to said switch serving said customer via a T1 access line operating in the "non-facility associated signaling" mode.

4. Apparatus for providing ISDN control messages to switches in a telecommunications network, each of said switches serving a plurality of subscribers, said system comprising
- at least one D-channel controller within the network, each D-channel controller associated with one of said switches;
- a user interface system at the premises of subscribers served by each of said switches;
- a central user support system;
- means for providing call set-up parameters generated in said subscribers' premises from said user interface system to said central user support system via a first dial-up data connection,
- means for communicating a signaling message derived from said call set-up parameters from said central user support system to the D-channel controller associated with the switch serving said subscriber, via a second dial-up data connection, and
- means in said associated D-channel controller for formulating ISDN control messages and transmitting said control messages to said switch serving said subscriber via a PRI interface.

5. The invention defined in claim 4 wherein said system further includes a non-ISDN transmission link for transporting data between said customers and the respective one of said switches serving said customers.

6. A method for providing access to ISDN capable switches in a telecommunications network, each of said switches serving a plurality of customers, said method comprising the steps of:
- deploying at least one D-channel controller within the network, each D-channel controller associated with a respective one of said switches;
- providing call set-up parameters generated at the premises of customers served by each of said switches from a user interface system at said premises via a dial-up data connection, to a respective user support system connected to each of said D-channel controllers
- communicating information derived from said call set-up parameters from said user support system to its connected D-channel controller;
- formulating ISDN signaling messages in said D-channel controller in response to said information; and
- transmitting said ISDN signaling messages to said switch serving said customer via a PRI interface.

7. The method defined in claim 6 further including the step of providing data originating in customer premises equipment to said switch serving said customer via a T1 access line operating in the "non-facility associated signaling" mode.

8. A A method for providing ISDN control messages to switches in a telecommunications network, each of said switches serving a plurality of subscribers, said method of comprising the steps of
- connecting at least one D-channel controller to selected ones of said switches in said network;
- providing call set-up parameters in said subscribers premises from a user interface system at the premises of subscriber served by a particular one of said switches to a central user support system via a first dial-up data connection,
- communicating a signaling message derived from said call set-up parmeters from said central user support system to the D-channel controller associated with the switch serving said subscriber, via a second dial-up data connection,
- formulating, in said associated D-channel controller, ISDN control messages, and
- transmitting said ISDN control messages to said switch serving said subscriber via a PRI interface.

* * * * *